United States Patent
Mosko

(10) Patent No.: US 9,391,896 B2
(45) Date of Patent: Jul. 12, 2016

(54) SYSTEM AND METHOD FOR PACKET FORWARDING USING A CONJUNCTIVE NORMAL FORM STRATEGY IN A CONTENT-CENTRIC NETWORK

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 139 days.

(21) Appl. No.: 14/202,984

(22) Filed: Mar. 10, 2014

(65) Prior Publication Data

US 2015/0256460 A1    Sep. 10, 2015

(51) Int. Cl.
*H04L 12/28* (2006.01)
*H04L 12/745* (2013.01)

(52) U.S. Cl.
CPC .................... *H04L 45/748* (2013.01)

(58) Field of Classification Search
CPC .................................................. H04L 65/4084
USPC ....................................................... 370/392
See application file for complete search history.

(56) References Cited

U.S. PATENT DOCUMENTS

| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |
| 5,629,370 | A | 5/1997 | Freidzon |
| 5,870,605 | A | 2/1999 | Bracho |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

(Continued)

*Primary Examiner* — Gerald Smarth
(74) *Attorney, Agent, or Firm* — Shun Yao; Park, Vaughan, Fleming & Dowler LLP

(57) ABSTRACT

One embodiment of the present invention provides a system for forwarding packets with hierarchically structured variable-length identifiers (HSVLIs) in a content-centric network (CCN). During operation, the system receives a packet with an HSVLI and determines, based on the HSVLI, a plurality of ports to which the packet should be forwarded. The plurality of ports include a set of individual port groups, and a respective port group includes one or more individual physical ports. The system derives a forwarding strategy based on the set of individual port groups and the one or more individual physical ports. The forwarding strategy is expressed as a formula in conjunctive normal form that indicates a logical conjunction among the set of port groups and a logical disjunction among the one or more individual physical ports. The system then forwards the packet using the derived forwarding strategy.

21 Claims, 5 Drawing Sheets

(56) References Cited

U.S. PATENT DOCUMENTS

| | | |
|---|---|---|
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,381,594 B1* | 4/2002 | Eichstaedt ........ G06F 17/30702 |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,080,073 B1* | 7/2006 | Jiang ................ G06F 17/2229 |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1* | 4/2014 | Ezick .................... G06F 17/504<br>706/57 |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1* | 1/2015 | Kumar .................. H04L 47/125<br>370/235 |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |

(56) References Cited

U.S. PATENT DOCUMENTS

| | | |
|---|---|---|
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1* | 4/2011 | Jacobson ............ H04L 45/745 370/392 |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1* | 6/2012 | Jacobson .......... H04L 29/12613 709/227 |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1* | 10/2012 | Lynch ................. H04L 47/52 370/235 |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |

(56) References Cited

U.S. PATENT DOCUMENTS

| | | |
|---|---|---|
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1* | 6/2014 | Kim .................. H04L 65/4084 709/204 |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2015/0381546 A1* | 12/2015 | Mahadevan ......... H04L 41/0803 709/207 |
| 2016/0021172 A1* | 1/2016 | Mahadevan ....... G06F 17/30598 709/204 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

B. Lynn. The Pairing-Based Cryptography Library, http://crypto.stanford.edu/pbc/.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.

D. Boneh and M. Franklin. Identity-Based Encryption from the Weil Pairing. Advances in Cryptology—CRYPTO 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Symposium (2005).

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer ScienceVolume 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim Hj Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

(56) References Cited

OTHER PUBLICATIONS

Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.

(56) References Cited

OTHER PUBLICATIONS

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SSIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

* cited by examiner

SYSTEM AND METHOD FOR PACKET FORWARDING USING A CONJUNCTIVE NORMAL FORM STRATEGY IN A CONTENT-CENTRIC NETWORK

RELATED APPLICATIONS

The subject matter of this application is related to the subject matter in the following applications:

U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013;

U.S. patent application Ser. No. 14/067,857, entitled "SYSTEM AND METHOD FOR MINIMUM PATH MTU DISCOVERY IN CONTENT CENTRIC NETWORKS," by inventor Marc E. Mosko, filed 30 Oct. 2013; and U.S. patent application Ser. No. 14/069,286, entitled "HASH-BASED FORWARDING OF PACKETS WITH HIERARCHICALLY STRUCTURED VARIABLE-LENGTH IDENTIFIERS OVER ETHERNET," by inventors Marc E. Mosko, Ramesh C. Ayyagari, and Subbiah Kandasamy, filed 31 Oct. 2013;

the disclosures of which are herein incorporated by reference in their entirety.

BACKGROUND

1. Field

The present disclosure relates generally to facilitating communication over a data network. More specifically, the present disclosure relates to a system and method for facilitating packet forwarding using a strategy based on conjunctive normal form.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, the Internet Protocol (IP) and Ethernet protocol, are both based on location-based addresses. That is, a consumer of content can only receive the content by explicitly requesting the content from an address (e.g., IP address or Ethernet media access control (MAC) address) closely associated with a physical object or location. This restrictive addressing scheme is becoming progressively more inadequate for meeting the ever-changing network demands.

Recently, content-centric network (CCN) architectures have been proposed in the industry. CCN brings a new approach to content transport. Instead of having network traffic viewed at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, content objects and interests are identified by their names, which is typically a hierarchically structured variable-length identifier (HSVLI). When forwarding packets with HSVLIs, longest-prefix-match lookups are often performed at the forwarding information base (FIB), which maintains a record of the Interest forwarding routes. Unlike the FIB used in IP (Internet Protocol) networks, the FIB used in CCNs allows for a list of outgoing ports for each prefix rather than a single port.

SUMMARY

One embodiment of the present invention provides a system for forwarding packets with hierarchically structured variable-length identifiers (HSVLIs) in a content-centric network (CCN). During operation, the system receives a packet with an HSVLI and determines, based on the HSVLI, a plurality of ports to which the packet should be forwarded. The plurality of ports include a first set of distinct port groups, and a respective port group includes a second set of individual physical or virtual ports. Note that the second set of individual physical or virtual ports are—for purposes of forwarding—considered equivalent. The system derives a forwarding strategy based on the first set of port groups and the second set of physical or virtual ports. The forwarding strategy is expressed as a formula in conjunctive normal form that indicates a logical conjunction among the first set of port groups, and a logical disjunction among the second set of individual physical or virtual ports. The system then forwards the packet using the derived forwarding strategy.

In a variation on this embodiment, the packet is an interest in a piece of content corresponding to the HSVLI, and determining the plurality of ports involves performing a longest-match lookup in a forwarding information base.

In a further variation, performing the longest-match lookup involves calculating a fixed-length hash function of the HSVLI.

In a variation on this embodiment, the virtual port group is a link aggregation group (LAG). The system uses a scheduler associated with the LAG to make forwarding decisions among multiple physical ports associated with the LAG.

In a variation on this embodiment, the virtual port group is a multi-path port group generated by a higher-level routing protocol. The system uses the higher-level routing protocol to make forwarding decisions among multiple physical ports associated with the multi-path port group.

In a variation on this embodiment, the forwarding strategy specifies that the packet is to be forwarded to each and every port within the first set of physical ports and at least one port within the second set of physical ports.

In a further variation, the forwarding strategy further specifies that the packet is to be forwarded to a minimum number of physical ports among ports within the port group.

In a variation on this embodiment, a higher-level routing protocol may determine that a specific destination is reachable via several physical or logical ports, such that the destination is represented as a conjunctive term of a disjunction of those physical or logical ports.

BRIEF DESCRIPTION OF THE FIGURES

In the figures, like reference numerals refer to the same figure elements.

DETAILED DESCRIPTION

Overview

Figure 1:
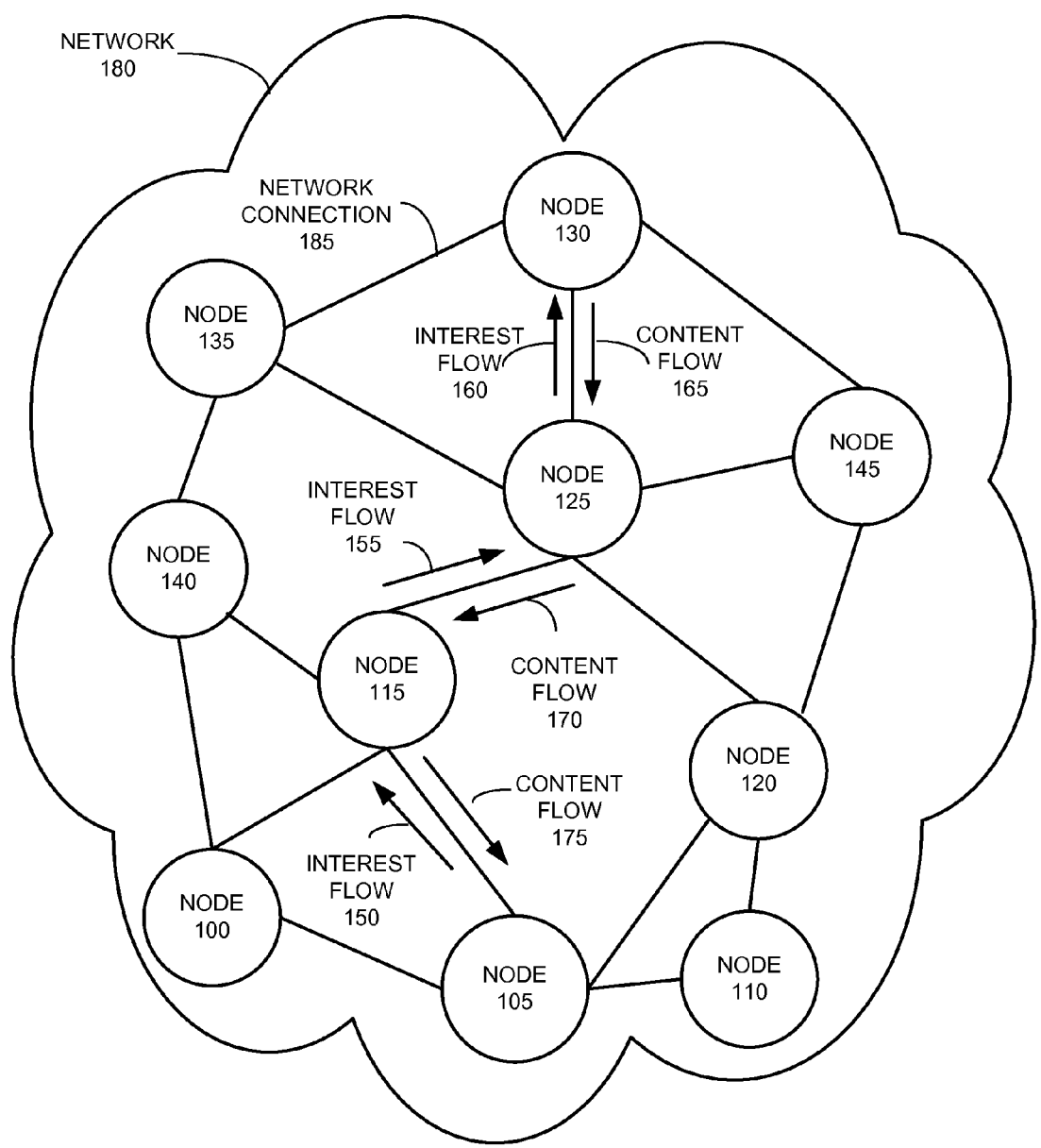
FIG. 1 illustrates an exemplary architecture of a network, in accordance with an embodiment of the present invention.

Embodiments of the present invention provide a system and method for effectively forwarding packets in CCNs to a plurality of ports. More specifically, the plurality of ports may include individual ports and port groups. A port group can be a link aggregation group where multiple links connect two devices, or it can be a multi-path group where multiple paths exist to reach a single destination. At the forwarding information base (FIB), the routing protocol uses a conjunctive normal form strategy to forward an Interest to all the ports listed in the FIB entry for a particular name prefix. Among the ports within a port group, an "OR" routing policy is applied, such that the Interest only needs to follow at minimum one, and preferably at most one, path for the port group. Among the different port groups, an "AND" routing policy is applied.

In general, CCN uses two types of messages: Interests and Content Objects. An Interest carries the hierarchically structured variable-length identifier (HSVLI), also called the "name," of a Content Object and serves as a request for that object. If a network element (e.g., router) receives multiple interests for the same name, it may aggregate those interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. There is not a host or query string. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an interest in "/parc/home/bob" will match both "/parc/home/bob/test.txt" and "/parc/home/bob/bar.txt." The longest match, in terms of the number of name components, is considered the best because it is the most specific.

"Interest:" A request for a Content Object. The Interest specifies an HSVLI name prefix and other optional selectors that can be used to choose among multiple objects with the same name prefix. Any Content Object whose name matches the Interest name prefix and selectors satisfies the Interest.

"Content Object:" A data object sent in response to an Interest. It has an HSVLI name and a Contents payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interest or originate content.

In accordance with an embodiment of the present invention, a consumer can generate an Interest in a piece of content and then send that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (interest flow 150) to node 115, which does not have the content available. Next, the Interest flows (interest flow 155) from node 115 to node 125, which again does not have the content. The Interest then flows (interest flow 160) to node 130, which does have the content available. The flow of the content then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

Interest Forwarding

Figure 2:
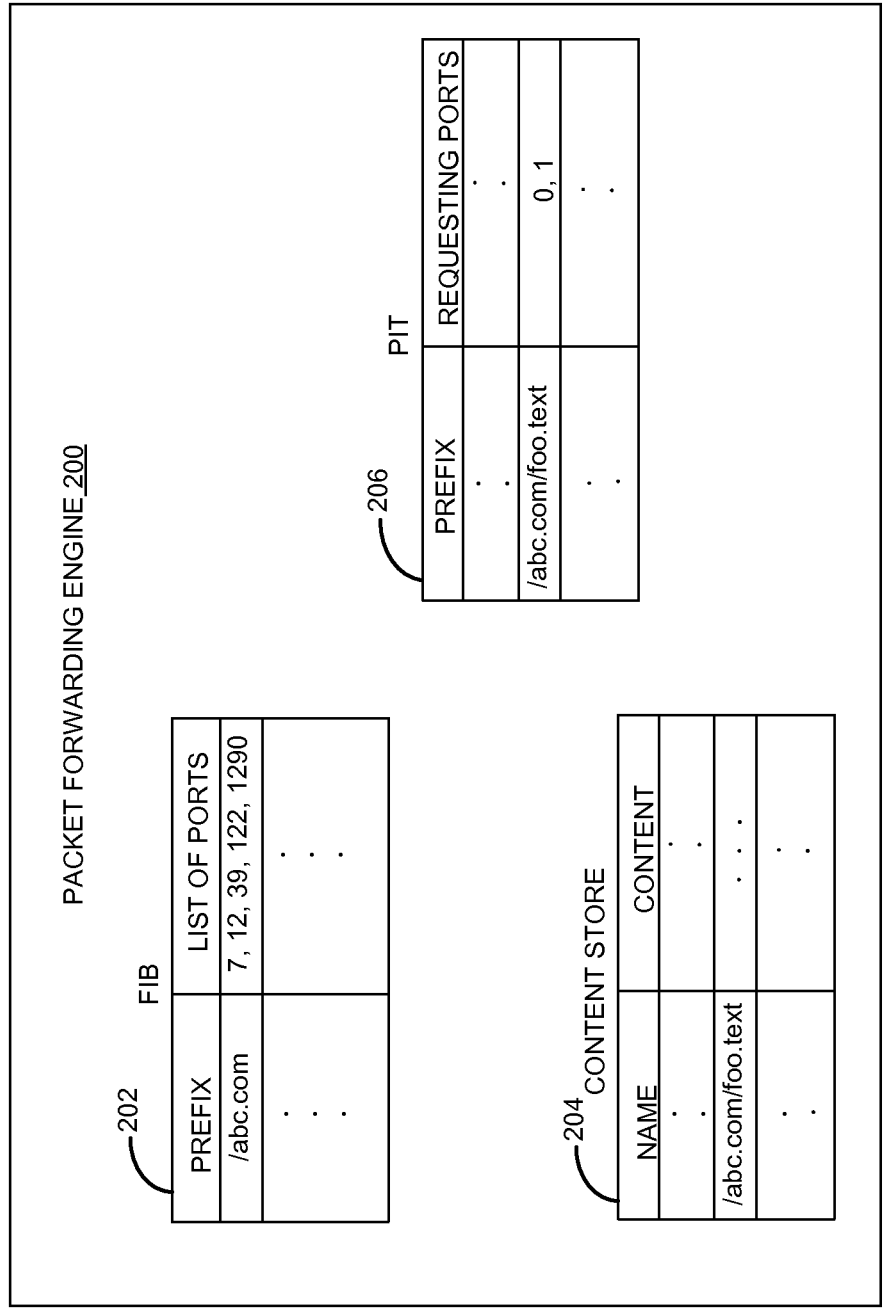
FIG. 2 presents a diagram illustrating an exemplary packet-forwarding engine in a content-centric network (CCN), in accordance with an embodiment of the present invention.

FIG. 2 presents a diagram illustrating an exemplary packet-forwarding engine in a content-centric network (CCN), in accordance with an embodiment of the present invention. In FIG. 2, packet-forwarding engine 200 includes three major data structures, including a Forwarding Information Base (FIB) 202, a Content Store (CS) 204, and a Pending-Interest Table (PIT) 206.

FIB 202 is used to forward Interest packets toward potential source(s) of matching Content Objects. Typically, a routing protocol is used to populate the FIB among all nodes in the network. The FIB entries are often indexed by the name prefixes. Note that, in CCN, there might be multiple sources that can satisfy an Interest. For example, multiple content producers may have the same name prefix. Therefore, unlike IP, an FIB entry in CCNs may include a list of outgoing ports. This reflects the fact that CCN is not restricted to forwarding on a spanning tree, because the self-satisfying nature of the Interests and the Content Objects means the loops can be avoided without establishing a spanning tree. In addition, this allows multiple sources to be queried in parallel.

Content Store (CS) 204 is similar to the buffer memory used in an IP router. More particularly, CS 204 temporarily buffers Content Objects that pass through this node, allowing efficient data retrieval by different consumers. When a router receives an Interest packet, it first checks whether there is a matching Content Object in its content store.

PIT 206 keeps track of Interests forwarded upstream toward content source(s) so that a returned Content Object can be sent downstream to its requester(s). In CCN, only Interest packets are routed. The returning Content Object follows the trail of the Interest packet back to the content requester. A PIT entry for an Interest specifies the name of the Interest and one or multiple incoming and outgoing ports for that Interest. Multiple ports listed in the PIT entry indicate that the same content has been requested by multiple downstream users, and multiple outgoing ports indicate that the same Interest is forwarded along multiple paths.

When an Interest packet arrives on a certain port, a longest-match lookup is done based on the content name, or the HSVLI. In some embodiments, hash-based forwarding is used, where each node uses the same hash function to encode name prefixes and then performs a longest-match lookup at the fixed-length hash. Detailed descriptions of the hash forwarding can be found in U.S. patent application Ser. No. 14/065,961, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013, the disclosure of which is incorporated herein by reference in its entirety. However, the strategy for forwarding packets to multiple ports, as used by embodiments of the present invention, is not limited to hash-based forwarding. Systems that rely on other types of CCN forwarding, such as those based on longest-prefix-match lookups using the HSVLI, can also use the same port-forwarding strategy.

The index structure used for the name lookup is ordered in such a way that a CS match will be preferred over a PIT match, which will be preferred over an FIB match. Hence, if there is already a Content Object in CS 204 that matches the Interest, the Content Object will be sent out via the port the Interest arrived on and the Interest will be discarded. Otherwise, the PIT will be checked to see if a match can be found. If so, the Interest's arrival port will be added to the PIT entry's requesting port list and the Interest will be discarded. Otherwise, the FIB will be checked. Note that for a system relying on hash forwarding, the FIB entries may be indexed based on the forwarding hashes, and checking the FIB involves finding a longest matching prefix in the FIB. If there is a match in the FIB, then the Interest needs to be forwarded to one or more of the ports listed in the FIB entry based on a forwarding strategy (or rule).

Note that for hardware implementations of CCN forwarding engines, it is desirable to have a forwarding strategy that is simple to execute but expressive, especially in situations where a port in the FIB entry represents a virtual port group, which points to a set of other ports. In CCN, a virtual port group may include a link aggregation group (LAG) where a set of network connections are combined in parallel to increase the throughput between two devices, and to provide redundancy in case of a link failure. Note that here the term "link aggregation group" can be used to refer not only to various schemes used by vendor-independent standards, such as the Link Aggregation Control Protocol (LACP) for Ethernet, but also to various proprietary solutions, such as Cisco's Port Aggregation Protocol (PAgP). In addition, a virtual port group can also be created when a single destination can be reached via multiple paths. Note that within each virtual port group, the Interest needs to be sent to a minimum of one port.

In the example shown in FIG. 2, the FIB entry for a name prefix /abc.com includes a list of forwarding ports, including ports 7, 12, 39, 122, and 1290, that may direct Interests with the name prefix /abc.com to corresponding content producers. Among these ports, port 1290 actually represents a virtual port group, which points to a set of other ports. For example, port 1290 may point to physical ports 6, 22, and 130. Note that because physical ports 6, 22, and 130 are link aggregated, which means they can lead to the same destination device, the Interest only needs to be forwarded to one of these ports. Hence, an "OR" policy can be used for these ports. On the other hand, the Interest needs to be forwarded to all other physical ports (ports 7, 12, 39, and 122). In some embodiments, when a forwarding engine uses an FIB entry to forward an Interest, the forwarding engine applies a forwarding strategy (or rule) that is expressed in a conjunctive normal form, such as $$\bigwedge_{i=1}^{n} \bigvee_{j=1}^{m_i} C_{ij},$$

where $C_{ij}$, i=1, . . . , n; j=1, . . . $m_i$, is either an atomic formula (such as a variable or constant) or the negation of an atomic formula. Here $C_{ij}$ represents a physical port, which may be a standalone physical port (when $m_i=1$) or a physical port belonging to a virtual port group (when $m_i>1$). Note that the conjunctive normal form refers to an ANDed set of ORed sets of statements. More specifically, the conjunctive normal form Boolean expression indicates that while forwarding, an AND operation is performed among the single physical ports and virtual port groups, and an OR operation is performed among the multiple ports within each virtual port group. Alternatively, the forwarding strategy can be expressed as $$\bigwedge_{i=1}^{k} A_i \bigwedge_{i=k+1}^{n} B_i = \bigwedge_{i=1}^{k} A_i \wedge \left( \bigwedge_{i=k+1}^{n} \bigvee_{j=1}^{m_i} B_{ij} \right),$$

where $A_i$ represents standalone physical ports, and $B_{ij}$ represents a physical port belonging to a virtual group $B_i$.

In the aforementioned example shown in FIG. 2, the standalone physical ports include ports 7, 12, 39, and 122, and the LAG includes ports 6, 22, and 130; hence, the forwarding strategy (or rule) for a packet with the longest prefix match to the name prefix /abc.com can be expressed as:

forwarding the packet to ports $(7) \wedge (12) \wedge (39) \wedge (122) \wedge (6 \vee 22 \vee 130)$. This Boolean expression indicates that the corresponding Interest packet will be forwarded to all of the following ports: ports 7, 12, 39, and 122. In addition, the Interest packet will be forwarded to port 6, or 22, or 130. Note that because ports 6, 22, and 130 belong to the same LAG, as long as the Interest is forwarded to one of these ports, the device at the other end of the LAG will receive the Interest packet.

Figure 3:
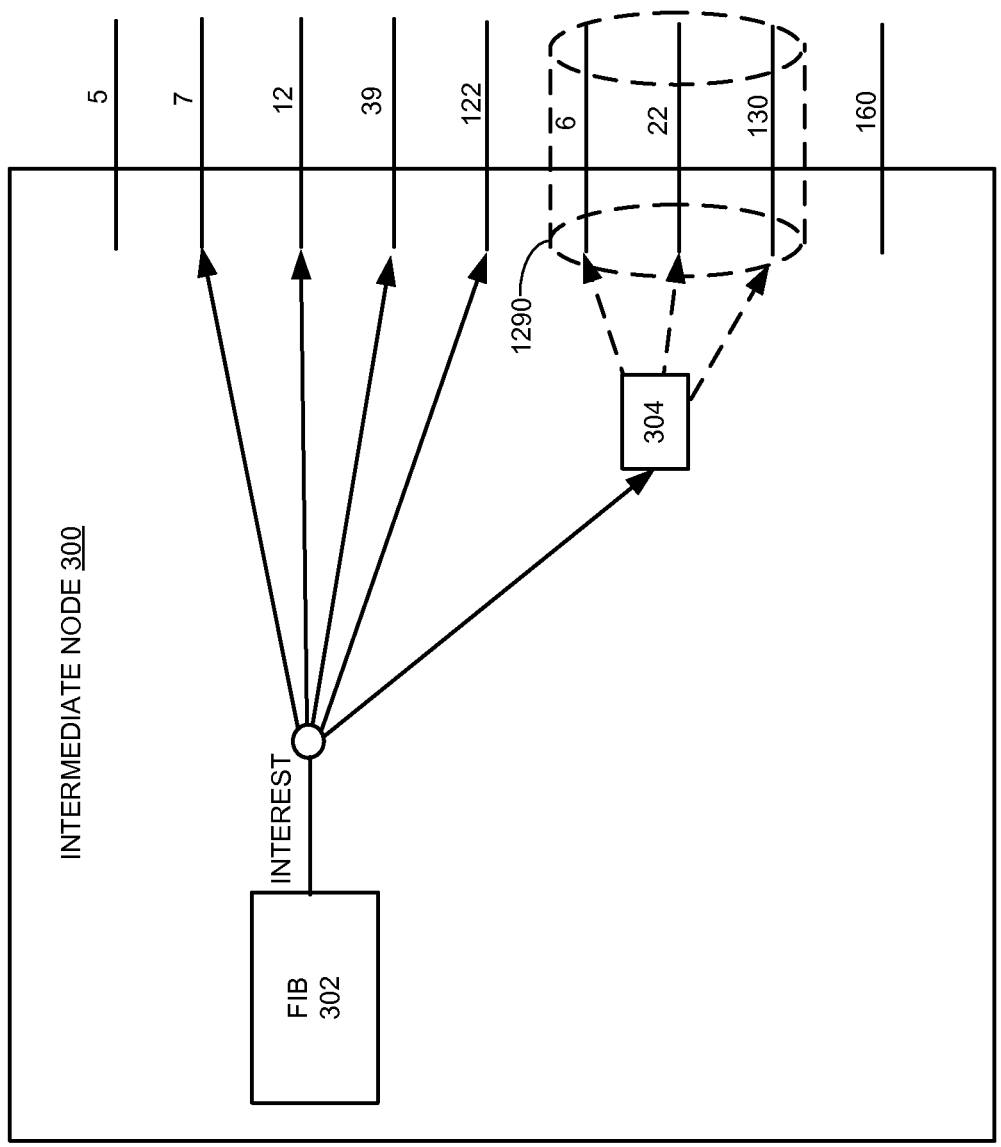
FIG. 3 presents a diagram illustrating the forwarding strategy based on a formula in conjunctive normal form, in accordance with an embodiment of the present invention.

FIG. 3 presents a diagram illustrating the forwarding strategy based on a formula in conjunctive normal form, in accordance with an embodiment of the present invention. In FIG. 3, intermediate node 300 includes a number of ports, such as ports 5, 7, 12, 39, 122, 6, 22, 130, and 160. During operation, intermediate node 300 receives an Interest packet from one of its ports, and performs the longest prefix match using the name of the Interest against entries in FIB 302. The matching FIB entry may include a list of ports (in this example, ports 7, 12, 39, 122, and 1290) indicating that the matching Interest should be forwarded to these ports in order to reach the content sources. The FIB entry may also indicate that port 1290 is a LAG, which includes three physical ports, ports 6, 22, and 130.

Based on the matching FIB entry, the forwarding engine within intermediate node 300 can apply a forwarding strategy (or rule) expressed using a formula that is in conjunctive normal form, such as: forwarding to ports $(7) \wedge (12) \wedge (39) \wedge (122) \wedge (6 \vee 22 \vee 130)$. In some embodiments, this conjunctive normal form expression can be stored in FIB 302. The conjunction relationship among the ports (including the virtual port groups) ensures that the matching Interest is forwarded to all of the ports listed in the FIB entry, and hence the Interest has a chance to reach all possible sources of the requested content. In FIG. 3, the solid arrows represent the AND logic, meaning that the Interest packet is sent to all these ports. On the other hand, for virtual port group 1290, among the ports within the group (such as ports 6, 22, and 130), a forwarding policy of "OR" can be applied, where the Interest can be forwarded to at least one of the ports. Note that the dashed arrows represent the OR logic, meaning that the Interest packet can be sent to any one or more of the ports within the virtual port group. Note that the "OR" relationship among the ports within the virtual port group ensures that the Interest packet only needs to be sent to at minimum one (and preferably at most one) of the ports.

In some embodiments, a LAG scheduler, such as LAG scheduler 304, can be used to determine to which physical port within in the virtual port group the Interest should be sent. For example, LAG scheduler 304 may distribute the Interest among the ports (such as ports 6, 22, and 130) in a round-robin fashion, or LAG scheduler 304 may distribute the Interest among the ports based on a hash function.

If virtual port group 1290 includes a set of ports that are grouped together by the routing protocol as a multi-path group, a different type of scheduler, such as one based on opportunistic multi-path scheduling that favors low-delay high-throughput paths, may be used to distribute the Interest among the multi-path ports. Alternatively, the scheduler may also use a round-robin fashion to distribute Interest packets among the multi-path ports.

In certain scenarios, a FIB entry may include both an LAG and a multi-path group, along with one or more physical ports. For example, a FIB entry for a name prefix /def.com may list a group of ports, including ports 7, 22, 1290, and a multi-path port group that includes physical ports 72 and 81. Among them, ports 7 and 22 are physical ports, and port 1290 is a LAG, which includes physical ports 6, 22, and 130. In some embodiments, FIB 302 generates the following forwarding strategy for this name prefix using a formula in conjunctive normal form: $(7) \wedge (22) \wedge (72 \vee 81) \wedge (6 \vee 22 \vee 130)$. Note that in this formula the LAG and the multi-path port group are treated similarly as an "OR" being performed over the physical ports within each virtual port group. Note that, even with the three different types of ports or port groups, the expression of the forwarding strategy only involves a two-step recursion, and can be relatively simple to implement. On the other hand, Interest forwarding within each virtual port group is not included in this conjunctive normal form formula. In some embodiments, A LAG scheduler can be used to distribute traffic within each LAG, and a separate scheduler (such as the one defined by the routing protocol that generates the multi-path port group) may be used to distribute traffic within each multi-path port group.

Sometimes, there may be overlaps between a LAG and a multi-path port group. In the aforementioned example, the FIB entry for name prefix /def.com includes ports 7, 22, 1290, and a multi-path port group. Among them port 1290 is a LAG that includes physical ports 6, 22, and 130. If the multi-path port group includes physical ports 6 and 72, then physical port 6 belongs to both LAG 1290 and the multi-path port group. As a result, forwarding the Interest to physical port 6 can serve both virtual port groups. In some embodiments, a scheduler (which may be the LAG scheduler, or a separate scheduler) can compute the most effective forwarding strategy for such a situation using a more sophisticated routing algorithm. In general, the optimal forwarding strategy is to minimize the number of physical ports to which the packet is forwarded. Such a strategy may result in an Interest being forwarded to more than one physical port within a port group. For example, an FIB entry may list three port groups, (1 or 2 or 3), (2 or 7), and (3 or 8). The system may determine that the optimal forwarding strategy is to forward the Interest to ports 1, 2, and 3, which means that the interest is forwarded over all 3 ports within the first group.

Figure 4:
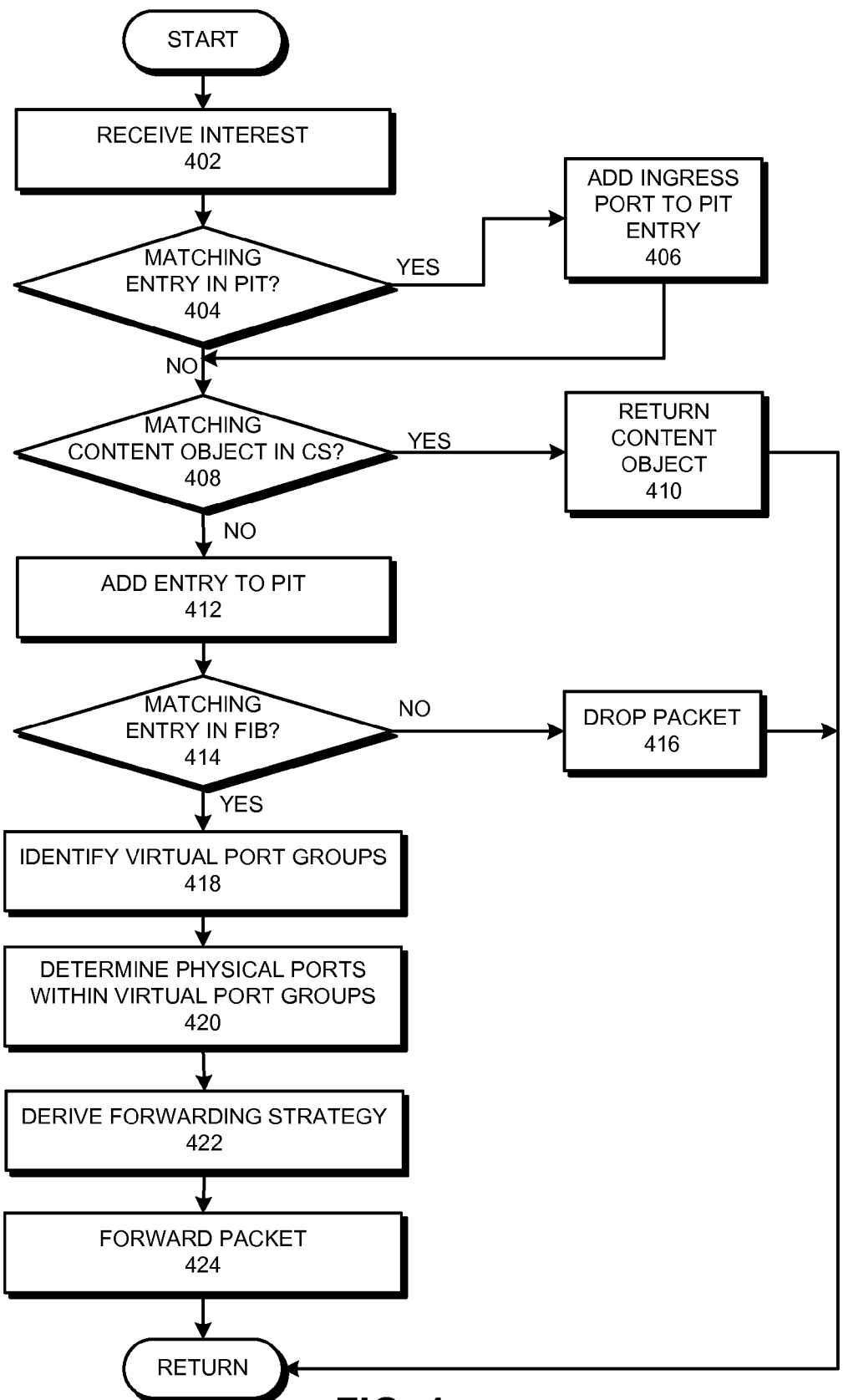
FIG. 4 illustrates the process of forwarding an Interest packet, in accordance with an embodiment of the present invention.

FIG. 4 illustrates the process of forwarding an Interest packet, in accordance with an embodiment of the present invention. During operation, an intermediate node in a CCN network receives an Interest packet with an HSVLI (operation 402). Note that the intermediate node can be a CCN-enabled switch that maintains the three major CCN data structures, the content store (CS), the pending Interest table (PIT), and the forwarding information base (FIB).

The intermediate node then determines, based on the name prefix of the Interest, whether an entry corresponding to the Interest can be found in the PIT (operation 404). If so, the node adds the ingress port on which the Interest is received to the corresponding PIT entry (operation 406). Otherwise, the node further determines, based on the name prefix, whether the content corresponding to the Interest can be found in the local Content Store (operation 408). If so, the node returns the matching Content Object (operation 410). If not, the system then adds a corresponding entry to the PIT (operation 412).

Subsequently, the node determines, based on the name prefix, whether an entry corresponding to the Interest can be found in the FIB (operation 414). In some embodiments, a longest prefix match is performed. If no matching entry is found in the FIB, the node may drop the Interest packet because it does not know where to forward the Interest (operation 416). If a corresponding entry can be found in the FIB, the node further identifies any virtual port group within the list of ports (operation 418). In some embodiments, the virtual port group can be a link aggregation group (LAG) or a multi-path port group. For each virtual port group, the node determines the actual physical port associated with the group (operation 420). Based on the list of ports in the FIB entry and the analysis of each virtual port group, the node then derives a forwarding strategy expressed in a formula in conjunctive normal form (operation 422). According to the formula, the Interest is forwarded to each physical port listed in the FIB entry (as the formula expresses an "AND" logic among all physical ports). In addition, the Interest should be forwarded to each virtual port group listed in the FIB entry, as the formula expresses a similar "AND" logic among the virtual port groups and the physical ports. However, within each virtual port group, instead of an "AND" logic (meaning sending the Interest to all physical ports), the formula indicates that an "OR" logic should be applied among all physical ports associated with the same virtual port group. This ensures that the Interest is forwarded to a minimum of one port within each virtual port group. In fact, it is also preferred that the Interest is forwarded to at most one of the physical ports within the virtual port group to reduce unnecessary traffic. The node then forwards the Interest based on the derived forwarding strategy (operation 424).

Figure 5:
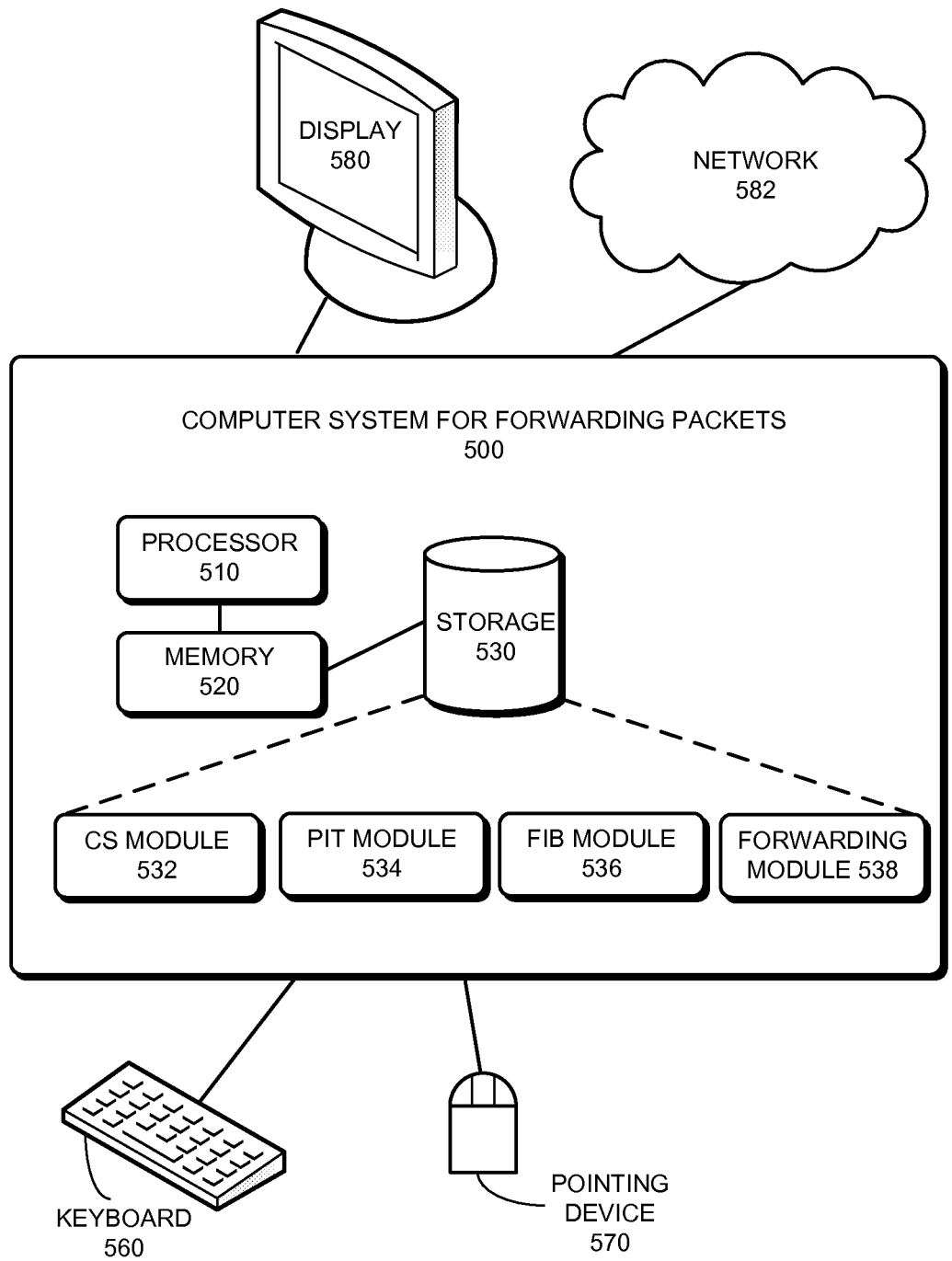
FIG. 5 illustrates an exemplary computer system for forwarding packets using a strategy expressed in conjunctive normal form, in accordance with an embodiment.

FIG. 5 illustrates an exemplary computer system for forwarding packets using a strategy expressed in conjunctive normal form, in accordance with an embodiment. A computer system 500 for forwarding packets includes a processor 510, a memory 520, and a storage 530. Storage 530 typically stores instructions that can be loaded into memory 520 and executed by processor 510 to perform the conjunctive normal form packet forwarding mentioned above. In one embodiment, the instructions in storage 530 can implement one or more of: a CS module 532, a PIT module 534, a FIB module 536, and a forwarding module 538, all of which can be in communication with each other through various means.

In some embodiments, modules 532, 534, 536, and 538 can be partially or entirely implemented in hardware and can be part of processor 510. Further, in some embodiments, the system may not include a separate processor and memory. Instead, in addition to performing their specific tasks, modules 532, 534, 536, and 538, either separately or in concert, may be part of general- or special-purpose computation engines.

Storage 530 stores programs to be executed by processor 510. Specifically, storage 530 stores a program that implements a system (application) for performing conjunctive normal form packet forwarding. During operation, the application program can be loaded from storage 530 into memory 520 and executed by processor 510. As a result, system 500 can perform the functions described above. System 500 can be coupled to an optional display 580, keyboard 560, and pointing device 570, and can also be coupled via one or more network interfaces to network 582.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for forwarding packets with hierarchically structured variable-length identifiers (HSVLIs) in a content-centric network (CCN), the method comprising:
receiving a packet with an HSVLI; determining, based on the HSVLI, a set of standalone physical ports; determining, based on the HSVLI, a set of virtual port groups, wherein a respective virtual port group includes one or more individual physical ports; deriving a forwarding strategy expressed as a formula in conjunctive normal form that indicates a logical conjunction among the standalone physical ports and the virtual port groups, and wherein the respective virtual port group is expressed as a logical disjunction among the one or more individual physical ports belonging to the virtual port group; and forwarding the packet using the derived forwarding strategy.

2. The method of claim 1, wherein the packet is an interest in a piece of content corresponding to the HSVLI, wherein determining the set of standalone physical ports and the set of virtual port groups involves performing a longest-match lookup in a forwarding information base.

3. The method of claim 2, wherein performing the longest-match lookup involves calculating a fixed-length hash function of the HSVLI.

4. The method of claim 1, wherein the set of virtual port groups include a link aggregation group (LAG), and wherein the method further comprises using a scheduler associated with the LAG to make forwarding decisions among multiple physical ports associated with the LAG.

5. The method of claim 1, wherein the set of virtual port groups include a multi-path port group generated by a higher-level routing protocol, and wherein the method further comprises using the higher-level routing protocol to make forwarding decisions among multiple physical ports associated with the multi-path port group.

6. The method of claim 1, wherein the forwarding strategy specifies that the packet is to be forwarded to each and every standalone physical port and to at least one individual physical port within the respective virtual port group.

7. The method of claim 6, wherein the forwarding strategy further specifies that the packet is to be forwarded to a minimum number of physical ports among ports within the set of virtual port groups.

8. A system for forwarding packets with hierarchically structured variable-length identifiers (HSVLIs) in a content-centric network (CCN), the system comprising:
a processor; and a storage device coupled to the processor and storing instructions which when executed by the processor cause the processor to perform a method, the method comprising: receiving a packet with an HSVLI; determining, based on the HSVLI, a set of standalone physical ports; determining, based on the HSVLI, a set of virtual port groups, wherein a respective virtual port group includes one or more individual physical ports; deriving a forwarding strategy expressed as a formula in conjunctive normal form that indicates a logical conjunction among the standalone physical ports and the virtual port groups, and wherein the respective virtual port group is expressed as a logical disjunction among the one or more individual physical ports belonging to the respective virtual port group; and forwarding the packet using the derived forwarding strategy.

9. The system of claim 8, wherein the packet is an interest in a piece of content corresponding to the HSVLI, wherein determining the set of standalone physical ports and the set of virtual port groups involves performing a longest-match lookup in a forwarding information base.

10. The system of claim 9, wherein performing the longest-match lookup involves calculating a fixed-length hash function of the HSVLI.

11. The system of claim 8, wherein the set of virtual port groups include a link aggregation group (LAG), and wherein the method further comprises using a scheduler associated with the LAG to make forwarding decisions among multiple physical ports associated with the LAG.

12. The system of claim 8, wherein the set of virtual port groups include a multi-path port group generated by a higher-level routing protocol, and wherein the method further comprises using the higher-level routing protocol to make forwarding decisions among multiple physical ports associated with the multi-path port group.

13. The system of claim 8, wherein the forwarding strategy specifies that the packet is to be forwarded to each and every standalone physical port and to at least one individual physical port within the respective virtual port group.

14. The system of claim 13, wherein the forwarding strategy further specifies that the packet is to be forwarded to a minimum number of physical ports among ports within the set of virtual port groups.

15. A computer-readable storage device storing instructions that when executed by a computer cause the computer to perform a method for forwarding packets with hierarchically structured variable-length identifiers (HSVLIs) in a content-centric network (CCN), the method comprising: receiving a packet with an HSVLI; determining, based on the HSVLI, a set of standalone physical ports; determining, based on the HSVLI, a set of virtual port groups, wherein a respective virtual port group includes one or more individual physical ports; deriving a forwarding strategy expressed as a formula in conjunctive normal form that indicates a logical conjunction among the standalone physical ports and the virtual port groups, and wherein the respective virtual port group is expressed as a logical disjunction among the one or more individual physical ports belonging to the respective virtual port group; and forwarding the packet using the derived forwarding strategy.

16. The device of claim 15, wherein the packet is an interest in a piece of content corresponding to the HSVLI, wherein determining the set of standalone physical ports and the set of virtual port groups involves performing a longest-match lookup in a forwarding information base.

17. The device of claim 16, wherein performing the longest-match lookup involves calculating a fixed-length hash function of the HSVLI.

18. The device of claim 15, wherein the set of virtual port groups include a link aggregation group (LAG), and wherein the method further comprises using a scheduler associated with the LAG to make forwarding decisions among multiple physical ports associated with the LAG.

19. The device of claim 15, wherein the set of virtual port groups include a multi-path port group generated by a higher-level routing protocol, and wherein the method further comprises using the higher-level routing protocol to make forwarding decisions among multiple physical ports associated with the multi-path port group.

20. The device of claim 15, wherein the forwarding strategy specifies that the packet is to be forwarded to each and every standalone physical port and to at least one individual physical port within the respective virtual port group.

21. The device of claim 20, wherein the forwarding strategy further specifies that the packet is to be forwarded to a minimum number of physical ports among ports within the set of virtual port groups.

* * * * *